(12) United States Patent
Lund et al.

(10) Patent No.: US 9,789,925 B2
(45) Date of Patent: Oct. 17, 2017

(54) BICYCLE FRAME WITH PASSIVE SEAT TUBE PIVOT JOINT

(71) Applicant: Trek Bicycle Corporation, Waterloo, WI (US)

(72) Inventors: Reggie Lund, Madison, WI (US); Christopher Pomering, Waterloo, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 14/878,658

(22) Filed: Oct. 8, 2015

(65) Prior Publication Data

US 2016/0194047 A1    Jul. 7, 2016

Related U.S. Application Data

(63) Continuation of application No. 14/513,000, filed on Oct. 13, 2014, now Pat. No. 9,278,724, which is a continuation of application No. 13/342,615, filed on Jan. 3, 2012, now Pat. No. 8,857,841.

(60) Provisional application No. 61/430,011, filed on Jan. 5, 2011.

(51) Int. Cl.
| | |
|---|---|
| *B62K 19/16* | (2006.01) |
| *B62K 19/18* | (2006.01) |
| *B62K 19/36* | (2006.01) |
| *B62K 25/04* | (2006.01) |
| *B62K 3/02* | (2006.01) |

(52) U.S. Cl.
CPC ............. *B62K 19/16* (2013.01); *B62K 3/02* (2013.01); *B62K 19/18* (2013.01); *B62K 19/36* (2013.01); *B62K 25/04* (2013.01); *B62K 2025/041* (2013.01); *Y10T 29/4984* (2015.01)

(58) Field of Classification Search
CPC ........ B62K 3/02; B62K 3/04; B62K 2025/041
See application file for complete search history.

(56) References Cited

U.S. PATENT DOCUMENTS

| | | | |
|---|---|---|---|
| 499,707 A | 6/1893 | Bolte | |
| 527,404 A | 10/1894 | Byrne | |
| 640,913 A | 1/1900 | Hull | |
| 673,661 A * | 5/1901 | Reid | ............ A63G 19/00 |
| | | | 280/227 |
| 973,217 A | 10/1910 | Sager | |
| 1,148,170 A | 7/1915 | Incerti | |
| 2,283,671 A | 5/1942 | Finlay et al. | |
| 3,030,124 A | 4/1962 | Holloway | |
| 3,966,230 A | 6/1976 | Nicol | |
| D244,593 S | 6/1977 | Manofsky et al. | |

(Continued)

FOREIGN PATENT DOCUMENTS

| | | | | |
|---|---|---|---|---|
| EP | 586754 A1 * | 3/1994 | ............ | B62K 19/36 |
| FR | 2704826 A1 * | 11/1994 | ............ | B62J 1/06 |

*Primary Examiner* — Kevin Hurley (57) ABSTRACT

A bicycle frame assembly that includes an upper frame member and a lower frame member that each extend between a head tube and a dropout. A seat tube extends between the upper frame member and the lower frame member. The seat tube is preferably connected to a bottom bracket of the lower frame member and is connected by a pivot to the upper frame member so that the seat tube can deflect from a rest position without altering an orientation of a top tube to a bottom tube of the upper and lower frame members, respectively.

19 Claims, 5 Drawing Sheets

(56) References Cited

U.S. PATENT DOCUMENTS

| | | |
|---|---|---|
| 4,577,879 A | 3/1986 | Vereyken |
| D284,646 S | 7/1986 | Turner |
| D292,074 S | 9/1987 | Shilplin |
| D308,500 S | 6/1990 | Berg et al. |
| D311,508 S | 10/1990 | Rieger et al. |
| 5,188,003 A | 2/1993 | Trammell, Jr. |
| D343,147 S | 1/1994 | Cognata et al. |
| 5,335,929 A | 8/1994 | Takagaki et al. |
| 5,498,013 A | 3/1996 | Hwang |
| D384,307 S | 9/1997 | Fisher |
| 5,725,225 A * | 3/1998 | Lai ................ B62K 25/30 280/275 |
| 5,797,613 A | 8/1998 | Busby |
| 5,803,476 A | 9/1998 | Olson et al. |
| 5,876,054 A | 3/1999 | Olson et al. |
| D411,145 S | 6/1999 | Shankin |
| 5,971,416 A | 10/1999 | Hsiung |
| 5,975,550 A | 11/1999 | Schonfeld |
| D418,778 S | 1/2000 | Allen et al. |
| D419,110 S | 1/2000 | Allen et al. |
| D419,111 S | 1/2000 | Allen et al. |
| D420,310 S | 2/2000 | Spriggs et al. |
| 6,076,845 A | 6/2000 | Lawwill et al. |
| 6,109,637 A | 8/2000 | Kirk |
| 6,206,396 B1 | 3/2001 | Smith |
| 6,318,744 B1 | 11/2001 | Lester |
| 6,386,567 B1 | 5/2002 | Schonfeld |
| 6,659,487 B1 | 12/2003 | Raco |
| 6,755,432 B2 | 6/2004 | Muser |
| 6,837,506 B2 * | 1/2005 | Amos ................ B62K 3/10 280/275 |
| D503,662 S | 4/2005 | Tiyawatchalapoing |
| 6,932,371 B2 | 8/2005 | Perez |
| 6,948,731 B2 | 9/2005 | Noer |
| D548,141 S | 8/2007 | Pizzi |
| 7,314,226 B2 | 1/2008 | Hsu |
| 7,516,971 B2 | 4/2009 | Storck |
| 7,591,475 B1 | 9/2009 | Calfee |
| 7,837,213 B2 | 11/2010 | Colegrove et al. |
| D637,526 S | 5/2011 | Choi et al. |
| D637,527 S | 5/2011 | Choi et al. |
| 2002/0125679 A1 | 9/2002 | Jung |
| 2003/0151226 A1 | 8/2003 | Amos |
| 2003/0227156 A1 * | 12/2003 | Morita ................ B62K 25/28 280/283 |
| 2004/0160036 A1 | 8/2004 | Perez |
| 2006/0119069 A1 | 6/2006 | D'Aluisio et al. |
| 2006/0138743 A1 * | 6/2006 | Beal ................ B62K 25/04 280/275 |
| 2007/0228689 A1 | 10/2007 | Lin |
| 2009/0102158 A1 | 4/2009 | Antonot |
| 2009/0267317 A1 | 10/2009 | Yang |
| 2010/0007113 A1 | 1/2010 | Earle et al. |
| 2012/0061941 A1 | 3/2012 | Choi et al. |
| 2014/0265406 A1 * | 9/2014 | Huber ................ B62K 19/36 296/29 |

\* cited by examiner

BICYCLE FRAME WITH PASSIVE SEAT TUBE PIVOT JOINT

CROSS-REFERENCE TO RELATED APPLICATIONS

This application is a Continuation of U.S. application Ser. No. 14/513,000, filed Oct. 13, 2014, titled "Bicycle Frame With Passive Seat Tube Pivot Joint," which is a Continuation of U.S. application Ser. No. 13/342,615, filed Jan. 3, 2012, titled "Bicycle Frame With Passive Seat Tube Pivot Joint," now U.S. Pat. No. 8,857,841, which claims priority to U.S. Provisional Patent Application Ser. No. 61/430,011 filed on Jan. 5, 2011 all of which are incorporated herein by reference in their entireties.

BACKGROUND OF THE INVENTION

The present invention relates to bicycles and, more particularly, to a bicycle frame assembly wherein the seat tube is connected at an overlapping intersection of a top tube and the seat stays by a passive pivot that allows the seat stay to deflect from a generally linear at-rest orientation to improve the vertical compliance of the bicycle frame.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism which powers the bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The portion of the frame defined by the head tube, seat post and bottom bracket and the structural members that join those three items together can be referred to as the main front triangular portion of the frame, with the seat stays and chain stays defining a rear triangular portion of the frame. The foregoing description represents the construction of a conventional bicycle frame which of course does not possess a suspension having any shock absorbing characteristics.

Although the increased popularity in recent years of off-road cycling, particularly on mountains and cross-country, has made a shock absorbing system in many instances a biking necessity. An exemplary rear wheel suspension system is disclosed in U.S. Pat. No. 7,837,213. Generally, bicycle suspension systems intended for off-road riding conditions include a number of links that are connected and movable or pivotable to allow the bicycle frame to absorb a portion of the energy associated with aggressive riding over uneven terrain. However, such robust suspension systems do not particularly lend themselves to extended rides over paved terrain. The robust nature of such systems increases the weight attributable to the bicycle assembly. During rides intended to test rider stamina, endurance, and conditioning, such robust suspension systems would detrimentally affect rider time performance.

Fixed shape forward and rear triangle frame shapes are generally well accepted as the preferred configuration for many road bicycles due to their collective light weight and robust frame. However, even paved surfaces can present discontinuities wherein most riders would prefer some degree of bicycle suspension to limit or reduce the forces communicated to the rider from payment discontinuities. The ever increasing capabilities of bicyclists have created a sub-set of the road bicycle termed an endurance bicycle. Endurance bicycles are generally understood as race-ready road bicycles with added comfort to allow riders to complete rides of ever increasing duration and/or distance. Many endurance bicycles maintain a fixed forward and rear triangle frame and provide impact dampening with suspension seat posts and/or vibration dampening handlebar assemblies.

An alternate approach to an endurance bicycle is disclosed in U.S. Pat. No. 6,932,371. U.S. Pat. No. 6,932,371 discloses a bicycle assembly wherein the seat tube forms a passive suspension element via the elimination of the seat stays and providing a second set of chain stays that are located in closer proximity to the bottom bracket that to the top tube. The frame assembly of U.S. Pat. No. 6,932,371 includes a number of gusset members that are required to provide the desired non-vertical stiffness of the frame assembly. In achieving the desired vertical compliance, the bicycle frame of U.S. Pat. No. 6,932,371 includes a number of supplemental structures that, in improving vertical compliance, detrimentally affect the overall weight of the underlying bicycle assembly.

Accordingly, there is a desire to provide a bicycle frame assembly that includes a passive suspension element but does not appreciably detrimentally affect the weight of the overall bicycle frame assembly.

BRIEF DESCRIPTION OF THE INVENTION

The present invention provides a bicycle frame assembly having a deflectable seat tube that overcomes one or more of the aforementioned drawbacks. One aspect of the invention discloses a bicycle frame assembly having an upper frame member and a lower frame member. The upper frame member includes a top tube and a pair of seat stays and extends between a dropout and a head tube in a generally continuous manner. The lower frame member includes a bottom tube, a bottom bracket, and a chain stay and extends between the dropout and the head tube. A seat tube extends from the lower frame member toward the upper frame member and passes beyond the top tube. The seat tube is connected to the upper frame member by a pivot so that more of the seat tube is located between the pivot and the bottom bracket than extends beyond the upper frame member. Preferably, an opening is formed through the top tube or a lug that connects the seat stays with the top tube. The seat tube preferably passes through the opening in the upper frame member. Alternatively, the seat tube could be perforated or otherwise contoured to pass generally around the more horizontal structure of the top tube and/or the seat stays. As another alternative, the seat tube could pass rearward relative to the top tube so as to be positioned in the space generally flanked by the seat stays.

Another aspect of the invention that is useable with one or more of the above aspects discloses a bicycle frame assembly that includes a forward frame triangle that includes a top tube and a bottom tube. The top tube includes a first end that is connected to a head tube and a second end. The bottom tube includes a first end that is connected to the head tube and a second end. A bottom bracket is connected to the second end of the bottom tube. A seat tube extends in an upward direction from the bottom bracket and a pair of seat stays is connected to the top tube and extends in a rearward direction beyond the forward frame triangle. A pivot connects the seat tube to the forward frame triangle proximate the top tube at a location nearer a bicycle seat than the bottom bracket. The pivot allows that portion of the seat tube disposed between the pivot and the bottom bracket to deflect from an at rest position during vertical loading of the seat tube.

Another aspect of the invention that is useable with one or more of the above aspects discloses a bicycle frame assembly having an upper frame member that includes a top tube and a pair of seat stays. The upper frame member extends between a dropout associated with a rear wheel and a head tube. An opening is formed in the upper frame member. A lower frame member that includes a bottom tube, a bottom bracket, and a chain stay extends between the dropout and the head tube. A seat tube extends from the lower frame member toward the upper frame member and passes through the opening in the upper frame member. A pivot connects the seat tube to the upper frame member proximate the opening so that more of the seat tube is located between the pivot and the bottom bracket than extends beyond the upper frame member.

Another aspect of the invention that is useable with one or more of the above aspects discloses a method of allowing deflection of a seat tube. A seat tube is connected to a bottom bracket. The seat tube is connected to an upper frame member with a pivot that is located at an overlapping intersection of the seat tube and the upper frame member so that the seat tube can deflect from alignment along a line between the bottom bracket and the pivot.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

DETAILED DESCRIPTION OF THE PREFERRED EMBODIMENT

Figure 1:
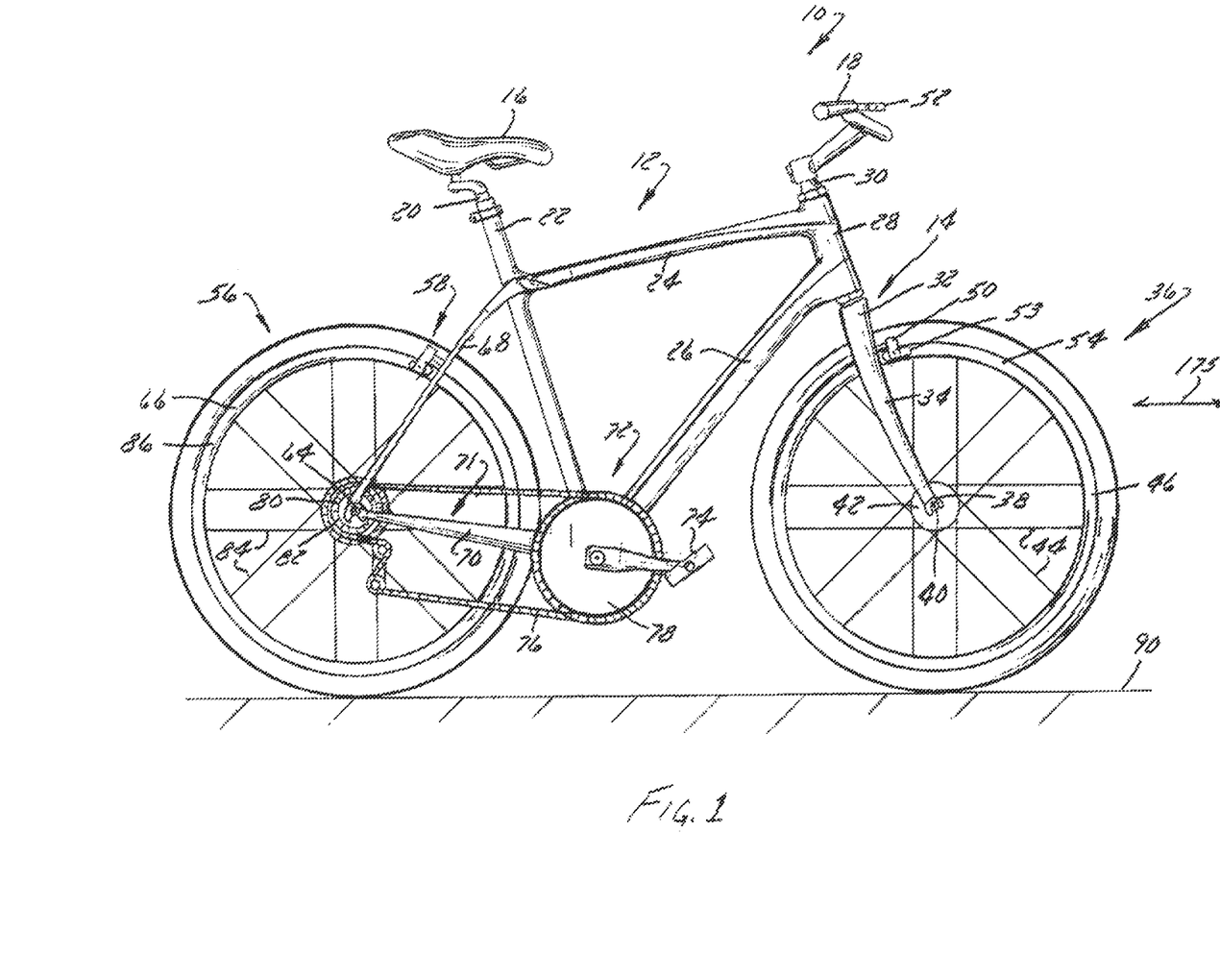
FIG. 1 is a side elevation view of a bicycle having a bicycle frame assembly according to the present invention.

FIG. 1 shows a bicycle 10 having a frame assembly 12 according to the present invention. Bicycle 10 includes a seat 16 and handlebars 18 that are attached to frame assembly 12. A seat post 20 is connected to seat 16 and slidably engages a seat tube 22 of frame assembly 12. A top tube 24 and a down tube 26 extend forwardly from seat tube 22 to a head tube 28 of frame 12. Handlebars 18 are connected to a stem or steer tube 30 that passes through head tube 28 and is connected or integrally formed with a fork crown 32. Understandably, handlebar 18 may include a stem that is constructed to slidably engage an interior cavity of steer tube 30. It is appreciated that one or more of the structures of bicycle 10 and frame assembly 12 can be constructed from similar materials, a variety of different materials, and various combinations thereof. Preferably, frame assembly 12 and seat tube 22 are formed of metal-type materials, such as aluminum-type materials, carbon fiber materials, and/or materials that are sufficiently formable and robust enough to support the rider of bicycle 10.

Fork assembly 14 includes a pair of fork blades or fork legs 34 that extend from generally opposite ends of fork crown 32 and are constructed to support a front wheel assembly 36 at an end thereof or dropout 38. Dropouts 38 engage generally opposite sides of an axle 40 constructed to engage a hub 42 of front wheel assembly 36. A number of spokes 44 extend from hub 42 to a rim 46 of front wheel assembly 36. A tire 48 is engaged with rim 46 such that rotation of hub 42 and rim 46, relative to fork legs 34, rotates tire 48.

Bicycle 10 includes a front brake assembly 50 having an actuator 52 attached to handlebars 18 and a pair of brake pads 53 positioned on generally opposite sides of front wheel assembly 36. Brake pads 53 are constructed to engage a brake wall 54 of rim 46 thereby providing a stopping or slowing force to front wheel assembly 36. A rear wheel assembly 56 includes a brake assembly 58 similar to front wheel brake assembly 50 but it is appreciated that one or both of front and rear wheel brake assemblies 50, 58 could be provided in other brake configurations such as a disk brake assembly wherein a rotor and a caliper are positioned proximate one or more of front wheel axle 40 or a rear axle 64, respectively. A rear wheel 66 is positioned generally concentrically about rear axle 64.

A pair of seat stays 62, 68 (FIG. 2) and a pair of chain stays 70, 71 (FIG. 2) extend rearward relative to seat tube 22 and offset rear axle 64 from a crankset 72. Crankset 72 includes a set of pedals 74 that is operationally connected to a flexible drive member such as a chain 76 via one or more variable diameter chain gears or a chain ring or sprocket 78. Rotation of chain 76 communicates a drive force to a gear cluster 80 positioned proximate rear axle 64. Gear cluster 80 is generally concentrically orientated with respect to rear axle 64 and includes a number of variable diameter gears.

Gear cluster 80 is operationally connected to a hub 82 of rear wheel 66. A number of spokes 84 extend radially between hub 82 and a rim 86 of rear wheel 66 of rear wheel assembly 56. As is commonly understood, rider operation of pedals 74 drives chain 76 thereby driving rear wheel 66 which in turn propels bicycle 10. Fork assembly 14 is constructed to support a forward end 88 of bicycle 10 above a ground surface 90. Handlebar 18 is connected to frame 12 and fork assembly 14 such that operator manipulation of handlebar 18 is communicated to fork assembly 14 to facilitate rotation of front wheel assembly 36 relative to frame assembly 12 along a longitudinal axis, indicated by arrow 175, of bicycle 10. As is commonly understood, such manipulation of handlebar 18 steers bicycle 10 during riding.

Understandably, the construction of bicycle 10 shown in FIG. 1 is merely exemplary of a number of bicycle configurations. That is, whereas bicycle 10 is shown as what is commonly understood as a street or road bike, it is appreciated that the present invention is applicable to a number of bicycle configurations including those bicycles with more aggression suspension systems commonly found in off-road or mountain bike frame configurations, and/or hybrids, cross-over or multi-purpose bicycle frame configurations.

Figure 2:
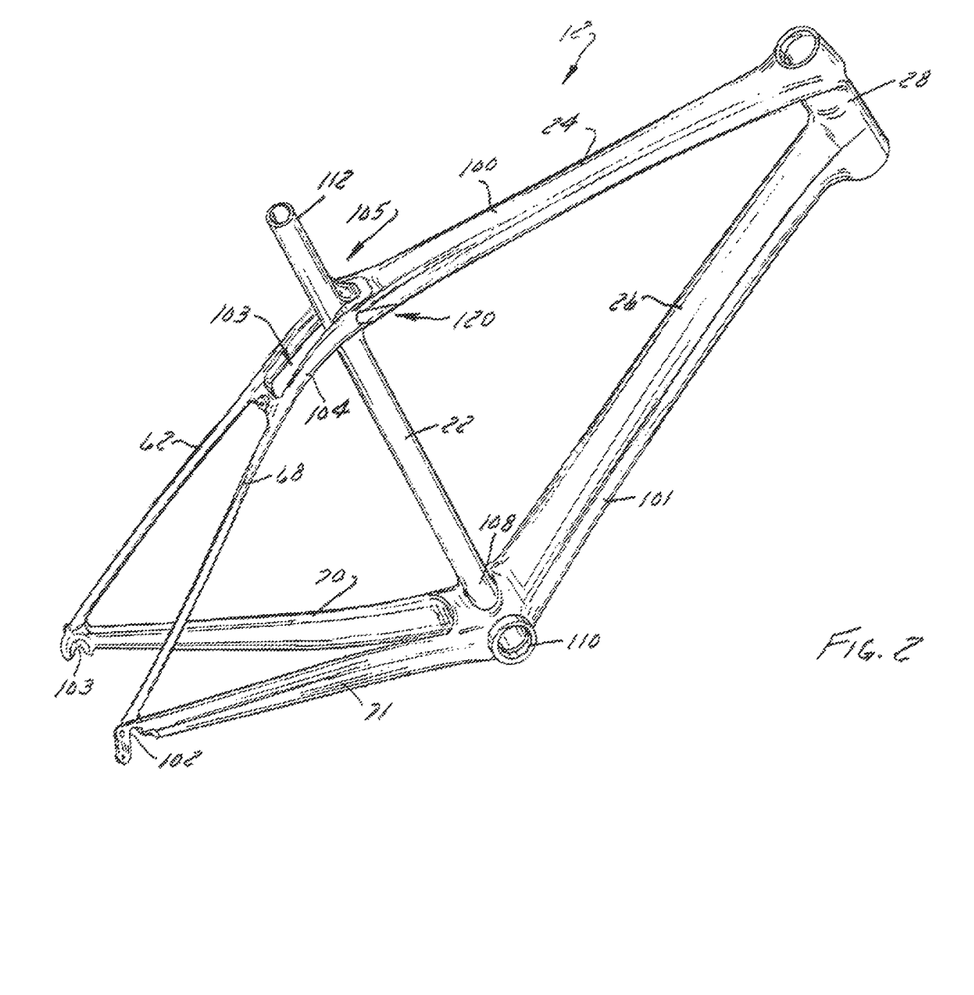
FIG. 2 is an elevated right hand perspective view of bicycle frame assembly shown in FIG. 1 with the wheels, seat, drive and handlebar assemblies removed therefrom.

Referring to FIGS. 1 and 2, top tube 24 and seat stays 68 extend in a fairly continuous manner to form an upper frame member 100 that extends from head tube 28 to a pair of dropouts 102, 103 that support rear axle 64. Upper frame member 100 can be formed as one piece and/or assembled from a distinct top tube 24, seat stays 68, and/or an optional lug 104 that is disposed between the top tube 24 and the seat stays 68. It is appreciated that seat stays 62, 68 and top tube 24 of upper frame member 100 could be formed as a unitary structure, a number of discrete permanently connected elements, or connected to one another via an optional lug 104 associated with an overlap area 105 of seat tube 22 and upper frame member 100. In a similar manner, it is also appreciated that down tube 26, bottom bracket 110, and chain stays 70, 71, whose assemblies collectively define a lower frame member that extends from head tube 28 to one or more dropouts 102, 103 could be formed as a unitary assembly wherein bottom bracket 110 is formed with down tube 26 or chain stays 70, 71, or an assembly wherein the chain stays 70, 71 and down tube 26 can be permanently affixed to a discrete bottom bracket lug or simply bottom bracket 110. Once assembled, as plainly shown in FIG. 1, bicycle 10 includes a forward frame triangle that is a generally defined by the triangular shape of the direction of extension of the seat tube, the top tube, and the down tube of frame assembly 12 regardless of the methodology or number of discrete elements used to form the frame assembly.

As shown in FIG. 2, seat tube 22 includes a first end 108 that is secured to bottom bracket 110 of bicycle frame 12 and a second end 112 that extends in a generally upward direction beyond the location of the lug or overlap area 105 with upper frame member 100. Preferably, seat post 20 (FIG. 1) telescopically cooperates with seat tube 22 of frame assembly 12. A passive pivot assembly 120 connects an upper portion of seat tube 22 to bicycle frame assembly 12 proximate overlap area 105 such that more of seat tube 22 extends between pivot assembly 120 and bottom bracket 110 than extends in an upward direction relative to the intersection of seat tube 22 and upper frame member 100.

Passive pivot assembly 120 completes the linkage between upper frame member 100, which includes top tube 24 and the structures associated with seat stays 62, 68. A lower end of seat tube 22 is secured to lower frame member 101, which includes the down tube 26 and bottom bracket 110 and preferably one of more chain stays 70, 71. As explained above, seat tube 22, top tube 24 and down tube 25 collectively generally define the forward triangle of frame assembly 12. Frame assembly 12 has a fairly robust and stable feel during use but is also constructed to provide impact dampening performance in a manner that does not allow changing of the relative connection points of any of the respective members of the forward frame triangle. As described further below with respect to FIG. 6, the non-bonded rigid yet pivotable connection of seat tube 22 with upper frame member 100 allows deflection of seat tube 22 in a vertical plane and in a direction along the longitudinal length of the seat tube 22 so as to allow the frame assembly 12 to provide a limited degree of suspension performance or vertical compliance without altering the orientation of the connection points of any of the frame members relative to one another.

Figure 3:
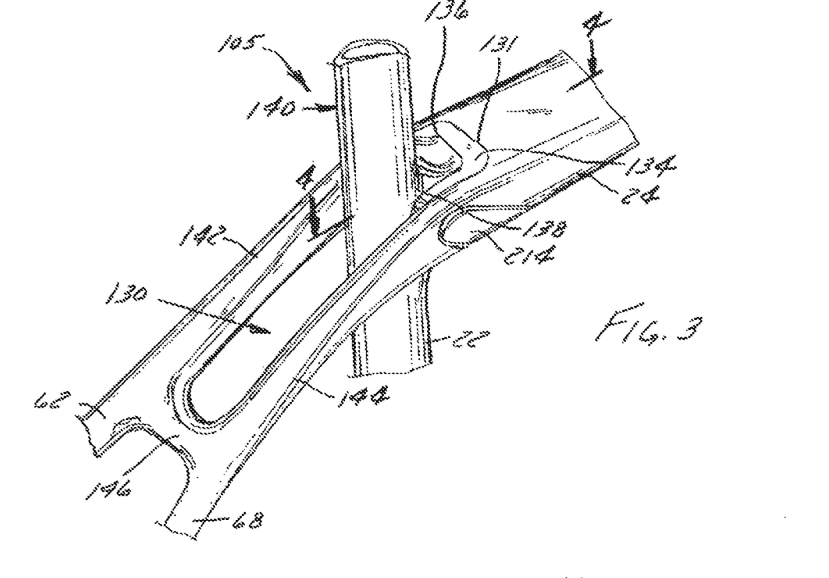
FIG. 3 is a view similar to FIG. 2 of an intersection of the seat tube with the upper frame member of the bicycle frame assembly shown in FIG. 1.
Figure 4:
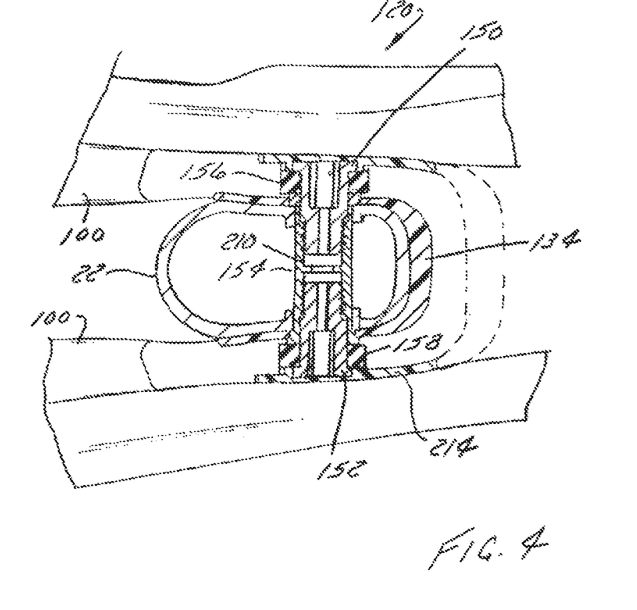
FIG. 4 is a cross-section of the intersection of the seat tube with the upper frame member taken along line 4-4 shown in FIG. 3.
Figure 5:
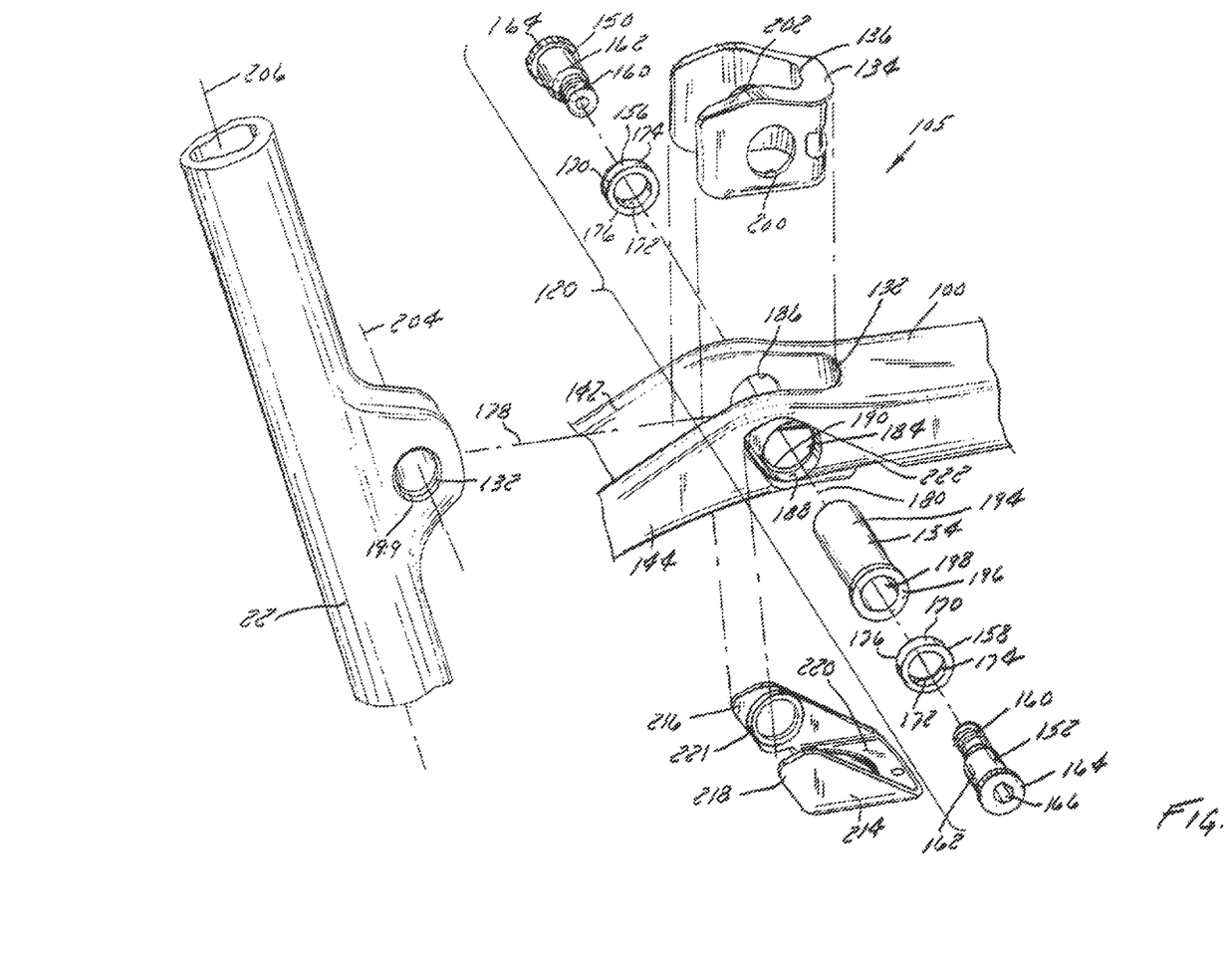
FIG. 5 is an exploded view of the assembly associated with the intersection of the seat tube and the upper frame member shown in FIG. 3.

As shown in FIGS. 3-5, overlap area 105 includes a passage 130 that is shaped to allow seat tube 22 to pass therethrough. An opening 132 (FIG. 5) is formed laterally through seat tube 22 and shaped to rotationally cooperate with pivot assembly 120. As mentioned above, it is envisioned that seat tube 22 merely pass over an axis or longitudinal area associated with one or more of the top tube, the seat stays, and/or a fabrication lug being formed therebetween. It is envisioned that the seat tube could be perforated or otherwise contoured to pass generally around the more horizontal structure of the top tube and/or the seat stays associated with upper frame member 100. As another alternative, the seat tube could pass rearward relative to the closed structure of top tube 24 so as to be positioned in the space generally flanked by the seat stays. Each configuration allows limited passive pivoting between seat stays 70, 71 and the adjacent structure of upper frame member 100 of bicycle frame assembly 12.

As shown in FIG. 3, passage 130 is bounded on a forward side 131 by an end wall associated with top tube 24 or a portion of the respective frame lug 104. A first optional gasket 134 is disposed between forward side 131 of overlap area 105 and top tube 24 and generally surrounds a forward side 136, and opposite lateral sides 138, 140 of seat tube 22. Optional gasket 134 prevents moisture and/or dirt and/or debris from entering the pivot area associated with passage 130 and the passage of seat tube 22 therethrough but does not otherwise interfere with the flexion of seat tube 22 during use of bicycle 10 as described further below with respect to FIG. 6. Passage 130 is bounded on opposite lateral sides by side walls 142, 144 of upper frame member 100. An optional rear web wall 146 completes the definition of passage 130 such that upper frame member 100 completely surrounds seat tube 22 with web wall 146 extending laterally between seat stays 62, 68.

As shown in FIGS. 4 and 5, pivot assembly 120 includes a first bolt or other fastener 150, a second bolt or other fastener 152, a guide sleeve 154, and first and second bearings or bushings 156, 158. Each of fasteners 150, 152 includes a threaded portion 160, a stem portion 162, and a head portion 164. The radial diameter of each fastener 150, 152 gradually increase from the respective threaded portion 160 to the stem portion 162 to the head portion 164. One or each of head portions 164 includes a drive surface 166 that is shaped to cooperate with a driving tool, such as a hex driver or the like for securing each of first and second fasteners 150, 152 relative to pivot assembly 120. Although shown as being formed on an interior radial surface of fasteners 150, 152, it is appreciated that driving surface 166 could have any number of shapes and/or be provided on a radial exterior surface of the corresponding fastener 150, 152. It is further appreciated that one of fasteners 150, 152 could formed integrally with sleeve 154 such that operation of one respective fastener secures pivot assembly 120 relative to bicycle frame assembly 12.

Each bushing 156, 158 includes an outer radial surface 170, an inner radial surface 172, an outboard lateral surface 174, and an inboard lateral surface 176. As used herein, the inboard and outboard lateral directions associated with surfaces 174, 176 of each bushing 156, 158 refers to the orientation of surfaces 170, 174 relative to a longitudinal vertical plane that contains longitudinal axis 175 of bicycle 10 and the relative position of the respective surfaces and/or structures relative to the same. For example, surfaces 176 of bushings 156, 158 are nearer a longitudinal axis, indicated by line 178, of upper frame member 100. Accordingly, surfaces 174 are further outboard and surfaces 176 are further inboard relative to one another and longitudinal axis 178 of upper frame member 100 along a longitudinal axis, indicated by line 180, of pivot assembly 120. As shown in FIG. 5, the longitudinal axis 180 of pivot assembly 120 is oriented in a crossing direction relative to, and is preferably normal to, longitudinal axis 178 of upper frame member 100.

Still referring to FIGS. 4 and 5, a first opening 184 and the second opening 186 are formed in each of the respective sidewalls 142, 144 of upper frame member 100 and centered along axis 180 of pivot assembly 120. A seat 188 extends circumferentially about at least one of openings 184, 186 in the lateral outboard facing surface of the respective sidewall 142, 144. Seat 188 is defined by a lip 190 that extends circumferentially about the corresponding opening 184, 186 and is shaped to cooperate with sleeve 154 and a corresponding bushing 156, 158.

Sleeve 154 includes a stem portion 194, the head portion 196, and an opening 198 formed therethrough. Sleeve 154 is constructed to slidably cooperate with openings 184, 186 in a direction aligned with axis 180. When assembled, head portion 196 of sleeve 154 traverses an overlapping area between opening 184 and a seat 199 associated with opening 132 of seat tube 22 as well as opening 200 associated with optional gasket 134. Optional gasket 134 includes a second opening 202 that, when assembled, is also concentrically oriented with respect axis 180 of pivot assembly 120 and cooperates with the other of fasteners 150, 152. Opening 132 of seat tube 22 circumferentially cooperates with stem portion 194 of sleeve 154 when the longitudinal axis of opening 132 is aligned axis 180 of pivot assembly 120. As explained further below with respect to FIG. 6, the axis of opening 132 of seat tube 22 is formed along a plane, indicated by line 204, that is offset in a forward direction relative to longitudinal axis 175 of bicycle 10 and with respect to a longitudinal axis 206 of seat tube 22.

Threaded portions 160 of each fastener 150, 152 operatively cooperate with a threaded surface 210 (FIG. 4) formed on an inner radial surface of sleeve 154. Bushings 156, 158 rotatably cooperate with stem portion 162 of each of fasteners 150, 152 and cooperate with seats 188 defined by upper frame member 100. As shown in FIGS. 4 and 5, pivot assembly 120 can include another optional gasket 214 that cooperates with the laterally outboard directed sides of pivot assembly 120. Gasket 214 includes a first arm 216 and a second arm 218 that extend in a generally upward direction relative to a web wall 220. The laterally inboard facing side of each arm 216, 218 includes a lip 221 that is shaped to snuggly cooperate with a radially outboard directed surface of head portion 164 of a respective fastener 150, 152. Preferably, upper frame member 100 includes a recess 222 that is shaped to mimic the shape of gasket 214 such that when assembled, gasket 214 provides a generally smooth contour along the exterior surface of upper frame member 100 associated with pivot assembly 120.

When assembled, pivot assembly 120 provides a secure connection between upper frame member 100 and seat tube 22 and does so in a manner that prevents lateral, longitudinal, and vertical movement of seat tube 22 relative to upper frame member 100 but allows rotation of seat tube 22 about axis 180 associated with opening 132 which is collinear with pivot assembly 120 relative to upper frame member 100. Such a connection allows only flexion or flexing movement of seat tube 22 relative to the other structural members of bicycle frame assembly 12 during use of bicycle 10.

Figure 6:
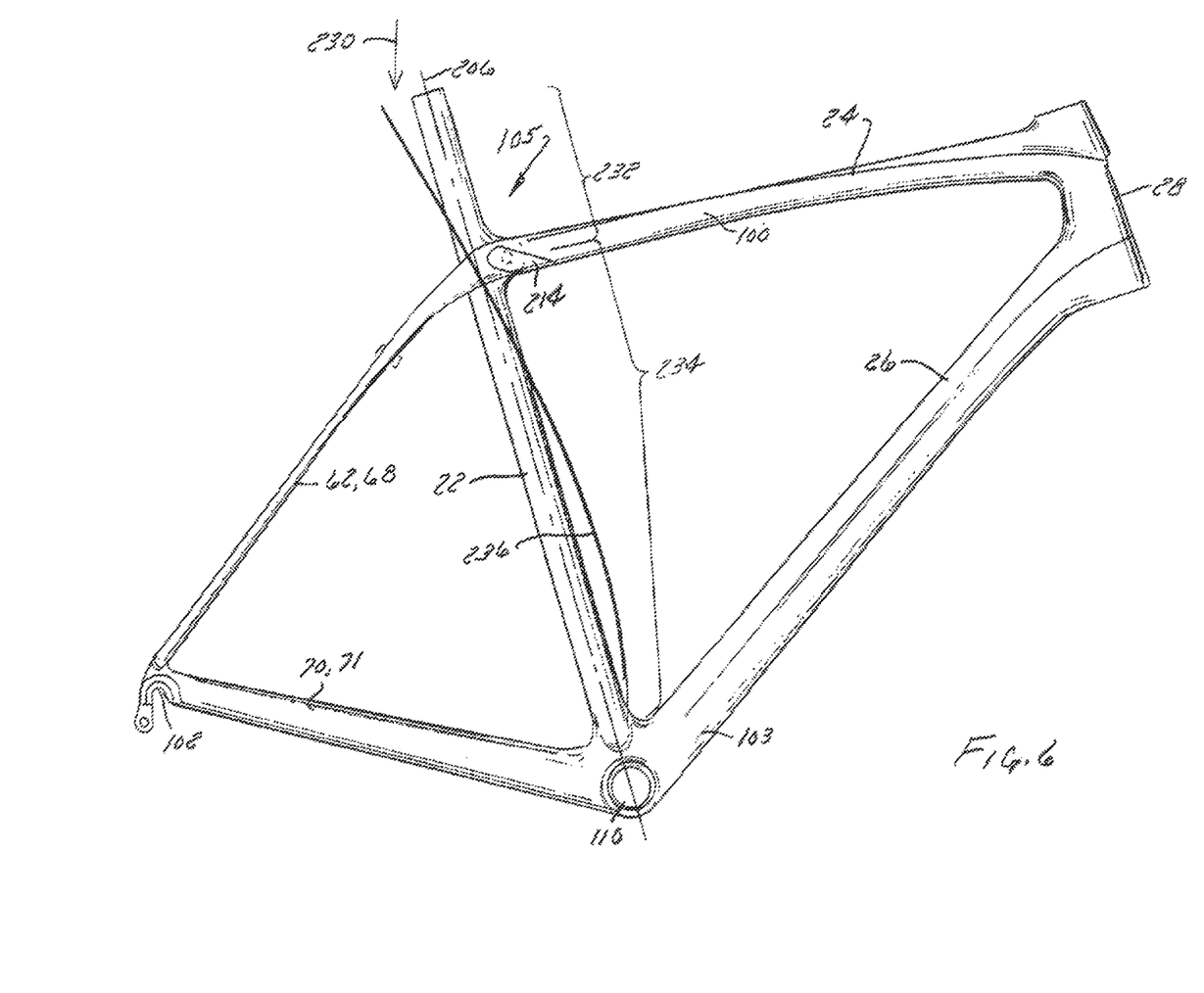
FIG. 6 is a side elevation view of the bicycle frame assembly shown in FIG. 2 and shows the loaded and loaded configurations of the seat tube associated with use of the bicycle frame assembly.

As mentioned above, other interactions between seat tube 22 and frame assembly 12 are envisioned that allow similar deflection of the seat tube 22. For instance, seat tube 22 could include a passage like passage 130 or otherwise be contoured so that the seat tube passed around the top tube/seat stays/lug and/or such that the top tube/seat stays/lug pass through the seat tube. Still another alternative includes connecting the seat stays to the upper frame member or top tube at a location forward of the seat tube such that the seat tube would be positioned in an area generally flanked by the seat stays. Referring to FIG. 6, although an axis, indicated by line 180, of pivot assembly 120 is offset in an forward direction relative to the longitudinal axis 206 of seat tube 22, is appreciated that axis 180 could be oriented to intersect axis 206 or offset in a rearward direction relative thereto so as to alter the deflection performance of seat tube 22 and/or to better suit the preferences of a given rider or class of users.

Referring to FIG. 6, during normal use of frame assembly 12, seat tube 22 maintains a generally "at rest" configuration as represented by seat tube 22 shown in FIG. 6. Preferably, seat tube 22 has a fairly linear at rest orientation. Understandably, during normal use, some initial deflection of seat tube 22 may occur depending on the weight and preferred orientation of the rider during normal use over relatively smooth terrain. During an impact event, indicated by arrow 230, a downward and rearward bending moment is imparted to seat tube 22 by the interaction of the rider with the rear portion of a saddle, which is commonly offset to the rear of the longitudinal centerline 206 of seat tube 22. Such loading of the seat tube allows seat tube 22 to pivot in a passive manner about pivot assembly 120 and results in a rearward deflection of an upper portion 232 of seat tube 22 positioned above pivot assembly 120 and a forward deflection of a lower portion 234 of seat tube 22 that is positioned between pivot assembly 120 and bottom bracket 110 relative to the at-rest orientation.

The deflection of seat tube 22 relative to upper frame member 100 and lower frame member 101 is shown graphically in FIG. 6 by line 236. Such a configuration allows near the entirety of seat tube 22 to deflect from an at rest position to a "bent" orientation, represented by line 236 to improve the vertical compliance of frame assembly 12. Supporting an upper end of seat tube 22 proximate the intersection of seat tube 22 with upper frame member 100 provides a fairly rigid feel of frame assembly 12 during all riding conditions but mitigates the communication of undampened travel surface discontinuities to the rider via rider interaction with the bicycle seat. Such performance improves rider comfort and decreases rider discomfort commonly associated with extended rides. Preferably, seat tube 22 deflects no more than 15 degrees from an at rest orientation and more preferably, seat tube 22 deflects no more than 7 degrees from a rest position in response to rider interaction with seat 16. Such a configuration has been shown to provide a desired degree of responsiveness to rider interaction with the bicycle frame and does so in a manner that improves the vertical compliance of the bicycle frame assembly without unduly detracting from the same. However, it is appreciated that any desired range of deflection can be provided. Preferably, the greatest deflection value is associated with a deflection that a rider will tolerate and still feel comfortable on the bicycle during most riding conditions to a near unperceivable deflection during most riding conditions.

As shown in the experimental data below, frame assembly 12 provides greater longitudinal deflection of the seat tube with comparable lateral stiffness for bicycle frames having similar shapes and with nearly negligible contribution to the overall weight of the bicycle frame assembly. It is further envisioned that the forward and/or rearward orientation of the pivot axis relative to the longitudinal axis of the seat tube can be manipulated to satisfy a wide variety of rider performance preferences and/or to alter the deflection performance of the seat tube. It is further appreciated that the construction of the seat tube can be manipulated to further alter the vertical compliance of the frame assembly while providing a robust bicycle frame assembly.

| Description | Size | Frame Sample # | Weight (gram) | Full Frame Torsional Stiffness (inches) | Head Tube Stiffness N * m per degree | BB horizontal deflection (2) inches | Vertical Compliance (inches) |
|---|---|---|---|---|---|---|---|
| 6SRS Baseline | 56 H3 | 2011-5428 | 850 | 0.1885 | 78 | 56 | 0.86 |
| 6SRS Pivot | 56 H3 | 2011-5697 | 898 | 0.186 | 79* | 54 | 1.38 |

As shown in the data provided above, configuring a bicycle frame with the passive pivot connection between the seat tube and the upper frame member provides improved vertical compliance of the seat tube of approximately 60% with an increase in frame assembly weight of approximately 48 grams or only approximate 5% of the overall weight of the frame assembly. Accordingly, bicycle frame assembly 12 provides a bicycle frame have acceptable frame responsiveness with improved vertical compliance for improving rider comfort.

Therefore, one embodiment of the invention includes a bicycle frame assembly having a forward frame triangle that includes a top tube and a bottom tube. The top tube includes a first end that is connected to a head tube and a second end. The bottom tube includes a first end that is connected to the head tube and a second end. A bottom bracket is connected to the second end of the bottom tube. A seat tube extends in an upward direction from the bottom bracket. A pair of seat stays are connected to the top tube and extend in a rearward direction beyond the forward frame triangle. A pivot connects the seat tube to the forward frame triangle proximate the top tube at a location nearer a bicycle seat than the bottom bracket.

Another embodiment of the invention that includes one or more features combinable with the above embodiment includes a bicycle frame assembly having an upper frame member that includes a top tube and a pair of seat stays. The upper frame member extends between a dropout associated with a rear wheel and a head tube. An opening is formed in the upper frame member. A lower frame member that includes a bottom tube, a bottom bracket, and a chain stay extends between the dropout and the head tube. A seat tube extends from the lower frame member toward the upper frame member and passes through the opening in the upper frame member. A pivot connects the seat tube to the upper frame member proximate the opening so that more of the seat tube is located between the pivot and the bottom bracket than extends beyond the upper frame member.

Another embodiment of the invention that is useable with one or more of the aspects of the above embodiments discloses a method of allowing deflection of a seat tube. A seat tube is connected to a bottom bracket. The seat tube is connected to an upper frame member with a pivot that is located at an overlapping intersection of the seat tube and the upper frame member so that the seat tube can deflect from alignment along a line between the bottom bracket and the pivot.

The present invention has been described in terms of the preferred embodiment, and it is recognized that equivalents, alternatives, and modifications, aside from those expressly stated, are possible and within the scope of the appending claims.

What is claimed is:

1. A bicycle frame assembly comprising:
 a forward frame triangle comprising:
 a top tube having a first end connected to a head tube and a second end;
 a bottom tube having a first end connected to the head tube and a second end;
 a bottom bracket connected to the second end of the bottom tube; and
 a flexible, unitary seat tube extending in an upward direction from the bottom bracket;
 a pair of seat stays connected to the top tube and extending in a rearward direction beyond the forward frame triangle; and
 a rotable coupling connecting the seat tube to the forward frame triangle proximate the top tube at a location nearer a bicycle seat than the bottom bracket.

2. The bicycle frame assembly of claim 1, further comprising a passage formed proximate an intersection of the seat stays and the top tube and shaped to accommodate the seat tube passing therethrough.

3. The bicycle frame assembly of claim 2, wherein an axis of the rotable coupling is oriented normal to an axis of the passage.

4. The bicycle frame assembly of claim 1, wherein the flexible, unitary seat tube is made of a fiber reinforced plastic.

5. The bicycle frame assembly of claim 1, wherein the seat tube can rotate at least 7 degrees about the rotable coupling allowing the seat tube to deflect from an at rest shape.

6. The bicycle frame assembly of claim 1, wherein a longitudinal axis of the rotable coupling is one of positioned forward of a longitudinal axis of the seat tube, aligned with the longitudinal axis of the seat tube, or positioned rearward the longitudinal axis of the seat tube.

7. A bicycle frame assembly comprising:
 an upper frame member that includes a top tube and a pair of seat stays and that extends between a dropout and a head tube;
 an opening formed in the upper frame member;
 a lower frame member that includes a bottom tube, a bottom bracket, and a chain stay, and that extends between the dropout and the head tube;
 a flexible, unitary seat tube extending from the lower frame member toward the upper frame member and passing through the opening in the upper frame member; and
 a rotable coupling connecting the seat tube to the upper frame member proximate the opening so that more of the seat tube is located between the rotable coupling and the bottom bracket than extends beyond the upper frame member.

8. The bicycle frame assembly of claim 7, wherein the rotable coupling is oriented either forward or rearward relative to a longitudinal center-line of seat tube.

9. The bicycle frame assembly of claim 7, further comprising a bridge that extends between the pair of seat stays and defines a rear wall of the opening.

10. The bicycle frame assembly of claim 7, wherein the flexible, unitary seat tube is made of a fiber reinforced plastic.

11. The bicycle frame assembly of claim 7, wherein the rotable coupling includes a first portion and a second portion that threadably cooperate with one another.

12. The bicycle frame assembly of claim 11, wherein each of the first portion and the second portion of the rotable coupling include a head portion and a shank portion wherein only the shank portion passes through the upper frame member.

13. A method of allowing deflection of a seat tube, comprising:
  connecting a flexible, unitary seat tube to a bottom bracket;
  connecting the seat tube to an upper frame member with a rotable coupling located at an overlapping intersection of a seat tube and the upper frame member so that the seat tube can deflect from alignment along an line between the bottom bracket and the rotable coupling; and
  forming the upper frame member with a pair of seat stays and a top tube.

14. The method of claim 13, further comprising defining an opening through the upper frame member that is shaped to allow the seat tube to pass therethrough.

15. The method of claim 14, further comprising closing a forward facing, a rearward facing, and opposite lateral facing sides of the opening.

16. The method of claim 13, further comprising connecting the pair of seat stays to one another at a location rearward of the seat tube that is offset from a rear wheel.

17. The method of claim 13, wherein the flexible, unitary seat tube is made of a fiber reinforced plastic.

18. The method of claim 13, further comprising providing a gasket that cooperates with at least one longitudinal end of the rotable coupling.

19. The method of claim 13, further comprising forming the rotable coupling as a first part and a second part that removably cooperate with the seat tube and engage the upper frame member from opposite lateral directions relative to a longitudinal direction of the upper frame member.

* * * * *